United States Patent [19]

Tamura et al.

[11] Patent Number: 5,247,342
[45] Date of Patent: Sep. 21, 1993

[54] LIGHT WAVELENGTH MEASURING APPARATUS INCLUDING AN INTERFERENCE SPECTROSCOPIC SECTION HAVING A MOVABLE PORTION

[75] Inventors: Youichi Tamura, Atsugi; Hiroshi Goto, Isehara; Takeshi Tsukamoto, Hadano; Yasutaka Ichihashi; Takamasa Imai, both of Yokosuka, all of Japan

[73] Assignees: Anritsu Corporation; Nippon Telegraph & Telephone Corporation, both of Tokyo, Japan

[21] Appl. No.: 777,371
[22] PCT Filed: Mar. 26, 1991
[86] PCT No.: PCT/JP91/00385
§ 371 Date: Nov. 29, 1991
§ 102(e) Date: Nov. 29, 1991
[87] PCT Pub. No.: WO91/14928
PCT Pub. Date: Oct. 3, 1991

[30] Foreign Application Priority Data

Mar. 29, 1990 [JP] Japan .................. 2-81875

[51] Int. Cl.⁵ .............................. G01B 9/02
[52] U.S. Cl. ..................... 356/346; 356/358
[58] Field of Search ............... 356/345, 346, 356, 358

[56] References Cited

U.S. PATENT DOCUMENTS

4,165,183  8/1979  Hall et al.
4,413,908 11/1983  Abrams ................. 356/346
4,847,878  7/1989  Badeau ................. 356/346

FOREIGN PATENT DOCUMENTS

50-22422  7/1975  Japan .
1-46017  10/1989  Japan .
2-49169   2/1990  Japan .

OTHER PUBLICATIONS

"A Digital Interferomter for Wavelength Measurement", Bennett et al, J. Phys. E: Sci. Instrum., Feb. 1980, pp. 174-177.
"Accurate Laser Wavelength Measurement with a Precision Two-Beam Scanning Michelson Interferometer", J. P. Monchalin et al, Applied Optics, vol. 20, No. 5, Mar. 1, 1981, pp. 736-757.
Applied Physics Letters, vol. 29, Sep. 15, 1976, No. 6 pp. 367-369.

*Primary Examiner*—Samuel A. Turner
*Attorney, Agent, or Firm*—Frishauf, Holtz, Goodman & Woodward

[57] ABSTRACT

A light wavelength measuring apparatus is designed to obtain a wavelength ($\lambda$) of target light, by using the number (N) of interference fringes having predetermined repetitive waveforms generated when an optical path length is changed by a change amount ($D_S$) by continuously moving a movable portion (7) of an interference spectroscopic unit (1) at a constant speed throughout a predetermined distance ($D_S$), according to $\lambda = D_S/N$. A wave counter (13) forms waveform count information ($N_a$) by counting the number of specific points, corresponding to each other in respective periods of the interference fringes, throughout an interval between predetermined measurement start and end points. A reference pulse generator (21) generates a reference pulse having a frequency higher than that of the repetitive waveforms of the interference fringes. A detector (22a, 23a) detects a first number of reference pulses present in one period of the interference fringes together with a second number of reference pulses present in an interval between the measurement start point and the first specific point, of the interference fringes, following the measurement start point, and a third number of reference pulses present in an interval between the last specific point of the interference fringes and the measurement end point. A CPU (26) corrects the waveform count information ($N_a$) obtained by the wave counter using the first, second, and third numbers of reference pulses detected by the detector to obtain waveform count information ($N_A$) including a fractional value, thereby calculating the wavelength of the target light according to $\lambda = D_S/N_A$.

10 Claims, 11 Drawing Sheets

PRIOR ART

FIG. 4

PRIOR ART

FIG.5

PRIOR ART

LIGHT WAVELENGTH MEASURING APPARATUS INCLUDING AN INTERFERENCE SPECTROSCOPIC SECTION HAVING A MOVABLE PORTION

FIELD OF THE INVENTION

The present invention relates to a light wavelength measuring apparatus for electrically measuring the wavelength of target light on the basis of the count value of interference fringes, supplied from an interference spectroscopic portion, and, more particularly, to a light wavelength measuring apparatus for measuring the wavelength of target light with high precision by using an interference spectroscopic unit such as a Michelson interferometer.

DESCRIPTION OF THE RELATED ART

There have recently been demands for easy measurement of the wavelength of target light, e.g., a laser beam with high precision and high resolution.

Figure 3:
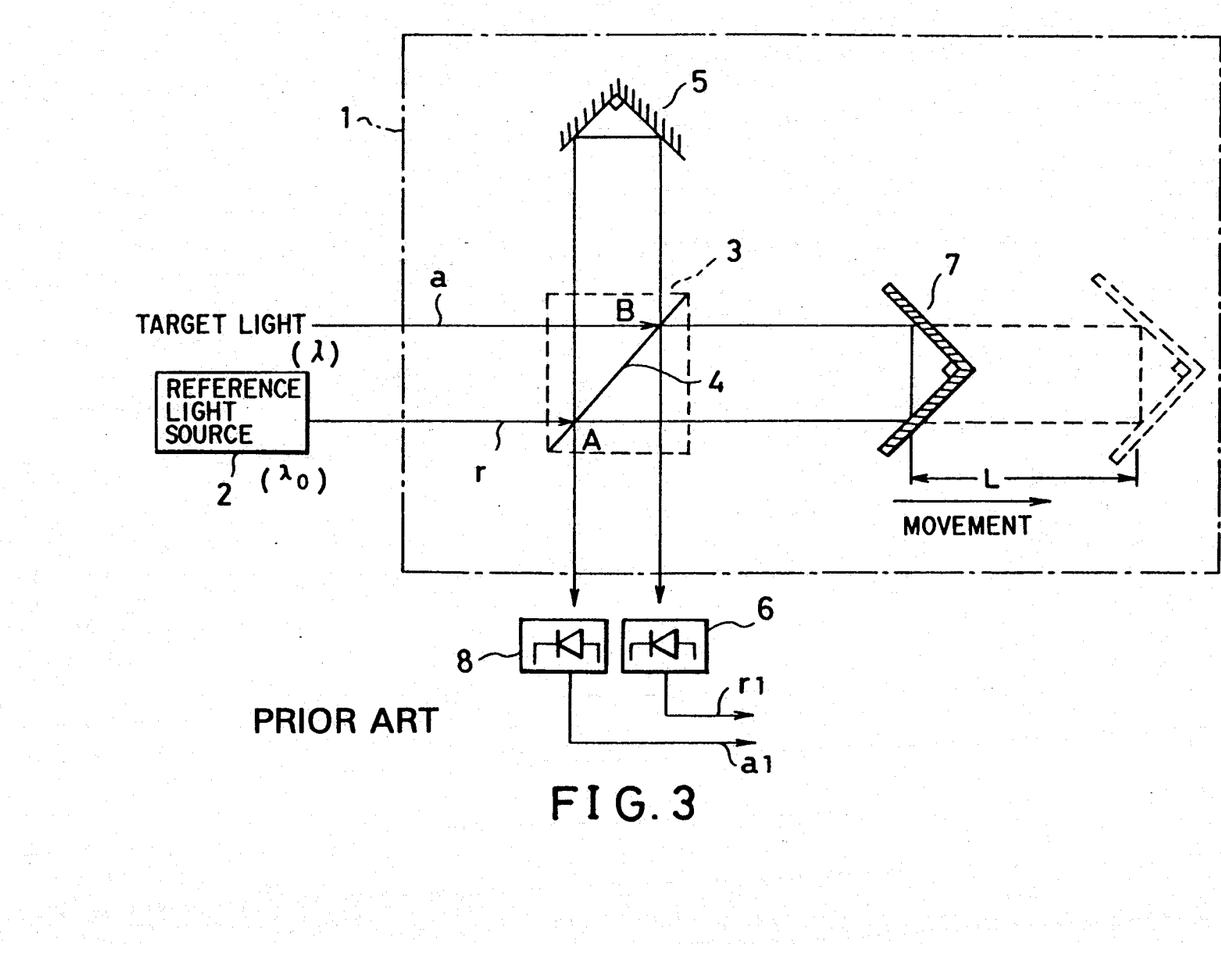
FIG. 3 is a schematic view showing an interference spectroscopic unit such as a general Michelson interferometer.

For this reason, a light wavelength measuring apparatus using an interference spectroscopic unit 1 such as a Michelson interferometer shown in FIG. 3 has been put into practice as an apparatus for electrically measuring the wavelength of target light with high precision without using an optical device such as a diffraction grating.

In this light wavelength measuring apparatus, coherent reference light r having a known reference wavelength $\lambda_0$, output from a reference light source 2, is incident on a half mirror 4 in a beam splitter 3. The half mirror 4 is arranged at an inclination angle of 45° with respect to the incidence angle of the reference light. Part of the reference light r is reflected at a point A on the half mirror 4 at a right angle, and its propagation direction is reversed through 180° by a stationary mirror 5. The light is then transmitted through a point B on the half mirror 4 to be incident on a reference light receiver 6. Part of the reference light r output from the reference light source 2 is transmitted through the point A on the half mirror 4, and its propagation direction is reversed through 180° by a movable mirror 7. The light is then reflected at the point B on the half mirror 4 to be incident on the reference light receiver 6.

Meanwhile, target light a having an unknown wavelength $\lambda$ is transmitted through the point B on the half mirror 4, and its propagation direction is reversed through 180° by the movable mirror 7. The light is then reflected at the point A on the half mirror 4 to be incident on a target light receiver 8. In addition, part of the target light a is reflected at a right angle at the point B on the half mirror 4, and its propagation direction is reversed through 180° by the stationary mirror 5. The light is then transmitted through the point A on the half mirror 4 to be incident on the target light receiver 8. The movable mirror 7 is arranged to be movable parallel to the optical path, as shown in FIG. 3.

Figure 4:
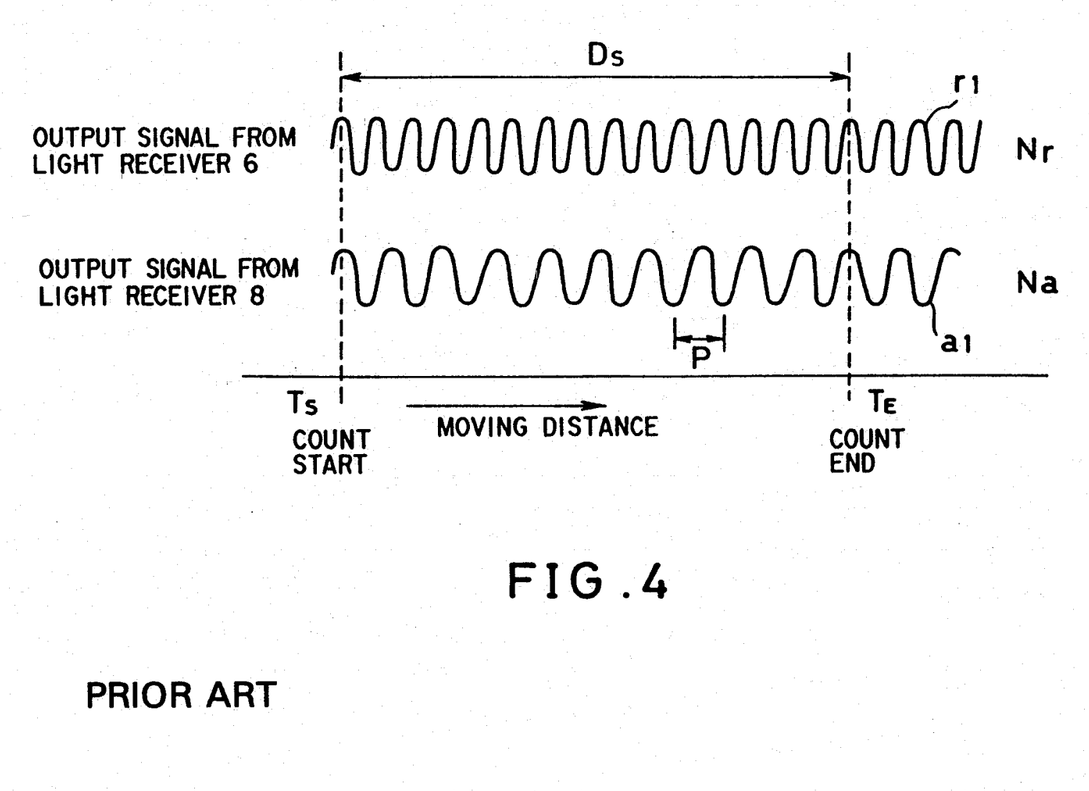
FIG. 4 is a timing chart showing the principle of wavelength measurement.

The reference light r and the target light a, which are respectively incident on the light receivers 6 and 8, respectively cause interference with the light components reflected by the stationary mirror 5 and the movable mirror 7. If the movable mirror 7 is moved in directions indicated by arrows, repetitive waveforms (interference fringes: fringes) formed by the interference are periodically formed in light intensity signals $r_1$ and $a_1$ corresponding to the light intensities of the interference light components output from the light receivers 6 and 8, as shown in FIG. 4. A pitch length P of each of these repetitive waveforms (interference fringes) corresponds to the wavelength of the corresponding light. Therefore, the wavelength $\lambda$ of the target light a can be obtained according to the following equation (1) by counting numbers Nr and Na of repetitive waveforms (interference fringes) in a case wherein the movable mirror 7 is moved by a predetermined distance L (corresponding to $D_S = 2L$ where $D_S$ is the change amount of the optical path length in FIG. 3) from a position indicated by solid lines in FIG. 3 to a position indicated by dotted lines:

$$\lambda = (Nr/Na)\lambda_0 \qquad (1)$$

In the light wavelength measuring apparatus using the interference spectroscopic unit 1 such as a Michelson interferometer shown in FIG. 3, in order to measure the wavelength $\lambda$ of the target light a, the numbers Nr and Na of the above-mentioned repetitive waveforms (interference fringes) must be obtained with high precision. For this purpose, a count start timing $T_S$ and a count end timing $T_E$ of a counter for counting the numbers Nr and Na of repetitive waveforms (interference fringes) must satisfy a predetermined relation. More specifically, if the timings $T_S$ and $T_E$ coincide with the uppermost or lowermost positions or the positive or negative peak values of the repetitive waveforms of the light intensity signals $r_1$ and $a_1$, as shown in FIG. 4, then the wavelength $\lambda$ can be obtained with higher precision by substituting the numbers Nr and Na of repetitive waveforms (interference fringes) counted between the timings $T_S$ and $T_E$ into equation (1).

Figure 5:
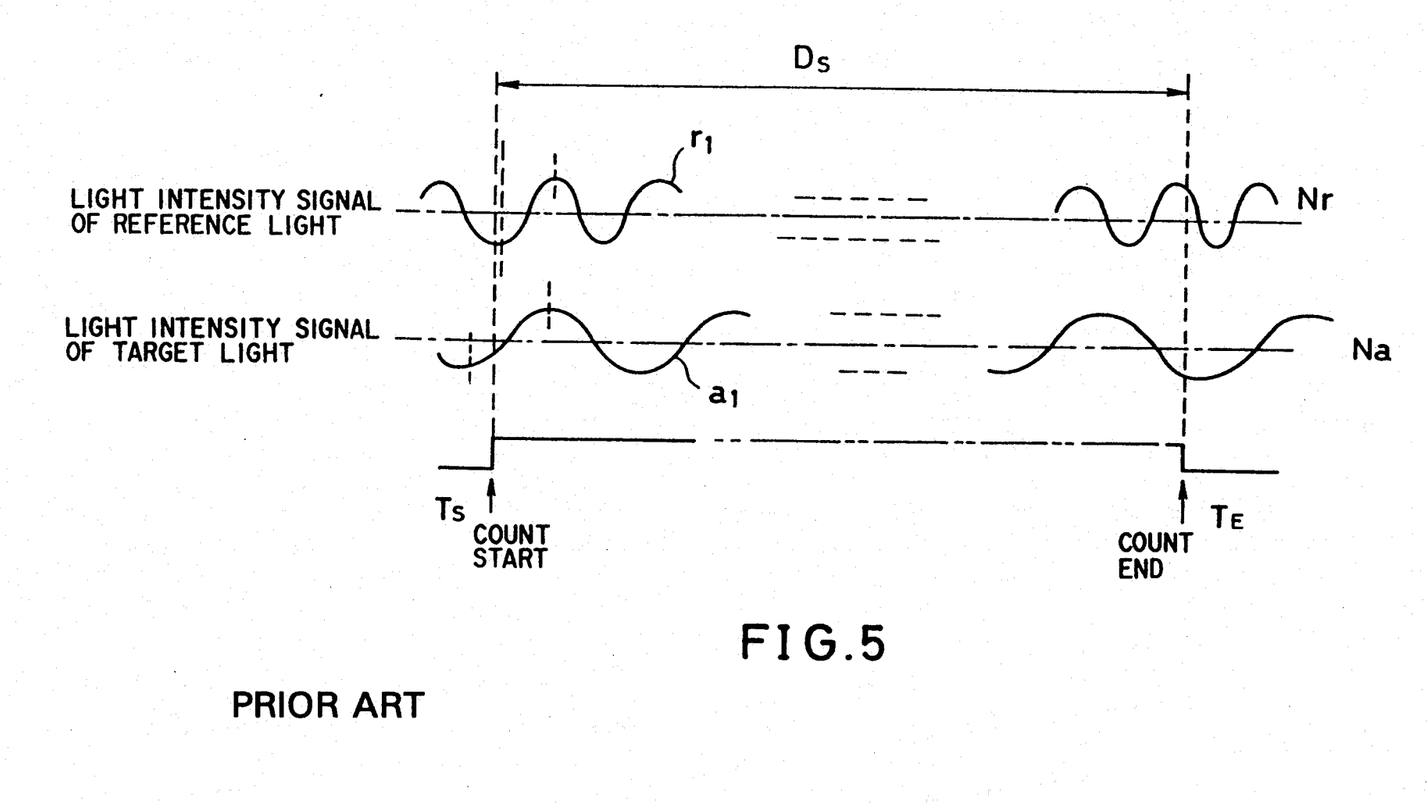
FIG. 5 is a timing chart for explaining problems in a conventional wavelength measurement technique.

If, however, the movable mirror 7 is moved by the predetermined distance L, since the light intensity signals $r_1$ and $a_1$ are generally asynchronous with the count start and end timings $T_S$ and $T_E$ of the counter, as shown in FIG. 5, the numbers Nr and Na of repetitive waveforms (interference fringes) obtained by the counter are different from correct numbers $N_R$ and $N_A$ of repetitive waveforms (interference fringes). More specifically, although the numbers Nr and Na of repetitive waveforms (interference fringes) obtained by the counter can assume only integral values, the correct numbers $N_R$ and $N_A$ of repetitive waveforms (interference fringes) can assume values containing fractional values after the decimal point Consequently, the wavelength $\lambda$ calculated by using the numbers Nr and Na of repetitive waveforms (interference fringes), which are obtained by omitting fractional values less than a value corresponding to one period and can assume only integral values, according to equation (1) includes an error corresponding to a maximum of two periods, in consideration of only the omitted fractional values. An improvement in measurement precision has a limitation accordingly.

In the above-described conventional measurement technique, in order to improve the measurement precision, it is required that the numbers of digits of the numbers Na and Na of repetitive waveforms (interference fringes) to be counted be increased as many as possible. For this purpose, however, the predetermined length L must be set to be long. If the predetermined distance L is increased, the overall measuring apparatus including the interference spectroscopic unit is undesirably increased in size. In addition, if the moving distance is increased, problems are posed especially in terms of mounting precision of an optical system in the interference spectroscopic unit. Moreover, since a disturbance occurs in the obtained interference wave, a problem is posed in the subsequent count processing. Such problems are easily expected from the fact that a measurement precision of, e.g., $\pm 0.1 \times 10^{-8}$ meters ($\pm 0.1$ pm) requires a moving distance of as long as 1.2 meters.

SUMMARY OF THE INVENTION

The present invention has been made in consideration of the above situation, and has an object to provide a light wavelength measuring apparatus in which when the number of repetitive waveforms (interference fringes) of a light intensity signal output from an interference spectroscopic section is to be detected, fractional values on both sides of the integral value of the repetitive waveforms are detected as well as the integral value so that a correct repetitive waveform (interference fringe) count including a fraction after the decimal point can be calculated, thereby greatly improving the target light measurement precision and resolution without increasing the size of the apparatus.

According to the first aspect of the present invention, there is provided a light wavelength measuring apparatus for obtaining a wavelength ($\lambda$) of target light, by using the number (N) of interference fringes having predetermined repetitive waveforms generated when an optical path length is changed by a change amount ($D_S$) by continuously moving a movable portion of an interference spectroscopic unit at a constant speed throughout a predetermined distance (L), according to $\lambda = D_S/N$, comprising:

a wave counter for producing waveform count information (Na) by counting the number of specific points, corresponding to each other in respective periods of the interference fringes, throughout an interval between predetermined measurement start and end points;

reference pulse generating means for generating a reference pulse having a frequency higher than that of the repetitive waveforms of the interference fringes;

detecting means for detecting a first number of reference pulses present in one period of the interference fringes together with a second number of reference pulses present in an interval between the measurement start point and the first specific point, of the interference fringes, following the measurement start point, and a third number of reference pulses present in an interval between the last specific point of the interference fringes and the measurement end point; and arithmetic means for correcting the waveform count information (Na) obtained by the wave counter using the first, second, and third numbers of reference pulses detected by the detecting means to obtain waveform count information ($N_A$) including a fractional value, thereby calculating the wavelength of the target light according to $\lambda = D_S/N_A$.

According to the second aspect of the present invention, there is provided a light wavelength measuring apparatus comprising:

an interference spectroscopic unit, having a movable reflecting portion and a stationary reflecting portion, the movable reflection portion being moved by a predetermined distance to output interference fringes having repetitive waveforms corresponding to target light;

first detecting means for detecting an integral value within an interval corresponding to the predetermined distance using one period of the interference fringes output from the interference spectroscopic unit as a unit;

second detecting means for detecting fractional values, of the interference fringes output from the interference spectroscopic unit, which are less than one period and are respectively present in start and end portions of the predetermined distance; and arithmetic means for correcting the integral value of the interference fringes detected by the first detecting means by using the respective fractional values of the interference fringes detected by the second detecting means, and for calculating a wavelength ($\lambda$) of the target light, by using a corrected numerical value ($N_A$) of the interference fringes and a change amount ($D_S$) of the optical path length, according to $\lambda = D_S/N_A$.

According to the third aspect of the present invention, there is provided a light wavelength measuring apparatus for separating input target light into two optical paths, forming interference light by combining the target light again, receiving a waveform signal based on a light intensity signal (al), of the interference light, generated by changing an optical path length of one of the optical paths by a predetermined distance, and calculating a wavelength ($\lambda$) of the target light on the basis of the number of waves of the waveform signal, a light wavelength measuring apparatus comprising:

a wave counter for counting changes in waveform of the light intensity signal, caused by changes in the predetermined distance, as a wave count, a fraction counter for counting a difference between a count start point of the wave counter and a first point position of the predetermined distance, and a difference between a count end point of the wave counter and an end point position of the predetermined distance, as clock pulse counts, respectively, a period counter for counting periods of the waveform as a clock pulse count, and means for calculating the wavelength of the target light in accordance with counts of the wave counter, the fraction counter, and the period counter.

According to the fourth aspect of the present invention, there is provided a light wavelength measuring apparatus for separating independently input target light and reference light into two optical paths each, forming two interference light components by combining the target light and the reference light again, receiving first and second waveform signals based on light intensity signals, of the two interference light components, generated by changing an optical path length of one of the two optical paths of each input light by a predetermined distance, and calculating a wavelength ($\lambda$) of the target light on the basis of a ratio of the numbers of waves of the first and second waveform signals, and a wavelength ($\lambda_0$) of the reference light, comprising:

first and second wave counters for counting changes in waveform of the respective light intensity signals, caused by changes in the predetermined distance, as wave counts;

first and second fraction counters for counting fractional portions at count start timings and count end timings of the first and second wave counters;

a period counter for counting periods of at least one of the first and second waveform signals; and wave count correcting means for correcting the count values counted by the first and second wave counters by using the count values of the first and second fraction counters and the count value of the period counter.

DETAILED DESCRIPTION OF THE INVENTION

Several embodiments of the present invention will be described below with reference to the accompanying drawings.

Figure 1:
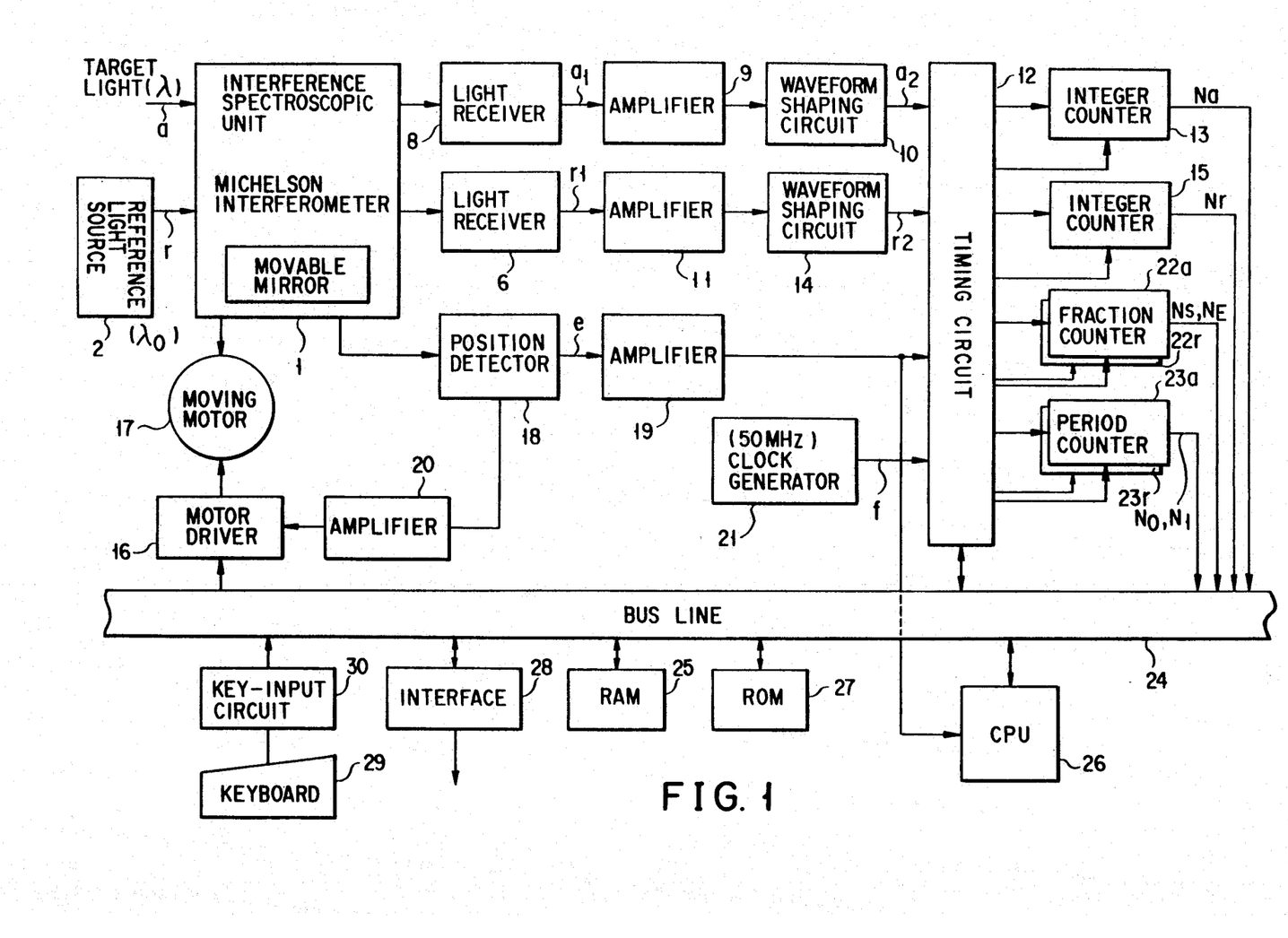
FIG. 1 is a block diagram showing a schematic arrangement of a light wavelength measuring apparatus according to the first embodiment of the present invention.

FIG. 1 is a block diagram showing a schematic arrangement of a light wavelength measuring apparatus according to the first embodiment of the present invention. The same reference numerals in FIG. 1 denote the same parts as in FIG. 3, and a repetitive description thereof will be omitted.

Externally input target light having an unknown wavelength $\lambda$ is incident on an interference spectroscopic unit 1 such as a Michelson interferometer shown in FIG. 3. Interference light corresponding to the target light a, output from the interference spectroscopic unit 1 such as a Michelson interferometer, is incident on a target light receiver 8. A light intensity signal $a_1$ output from the target light receiver 8 is amplified by an amplifier 9 and is shaped into a rectangular wave signal $a_2$ by a waveform shaping circuit 10. The signal $a_2$ is then input to an integer counter 13 (for counting interference fringes) for target light through a timing circuit 12.

Meanwhile, reference light having a known wavelength $\lambda_0$, output from a reference light source 2, is incident on the interference spectroscopic unit 1 such as a Michelson interferometer. Interference light corresponding to the reference light, output from the interference spectroscopic unit 1 such as a Michelson interferometer, is incident on a reference light receiver 6. A light intensity signal $r_1$ output from the reference light receiver 6 is amplified by an amplifier 11 and is shaped into a rectangular wave signal $r_2$ by a waveform shaping circuit 14. The signal $r_2$ is then input to an integer counter 15 (for counting interference fringes) for reference light through the timing circuit 12.

A movable mirror 7 (see FIG. 3) in the interference spectroscopic unit 1 such as a Michelson interferometer as described above is moved/controlled by a drive motor 17 driven by a motor driver 16. The apparatus includes a position detector 18 for detecting the position of the movable mirror 7. The position detector 18 outputs a position detection signal e which is set at high (H) level when the movable mirror 7 enters a movement range of a predetermined distance L. This position detection signal e is amplified by an amplifier 19 and is subsequently input to the timing circuit 12. In addition, the position detector 18 supplies a stop signal to the motor driver 16 through an amplifier 20 when the movable mirror 7 is moved out of the movement range to reach a stop position set outside the movement range.

In addition, a 50-MHz clock signal f is input from a clock oscillator 21 to the timing circuit 12. Furthermore, fraction counters 22a and 22r and period counters 23a and 23r for counting the clock signal f are connected to the timing circuit 12. These counters 22a and 22r, and 23a and 23r respectively correspond to the target light a and the reference light r.

Figure 2:
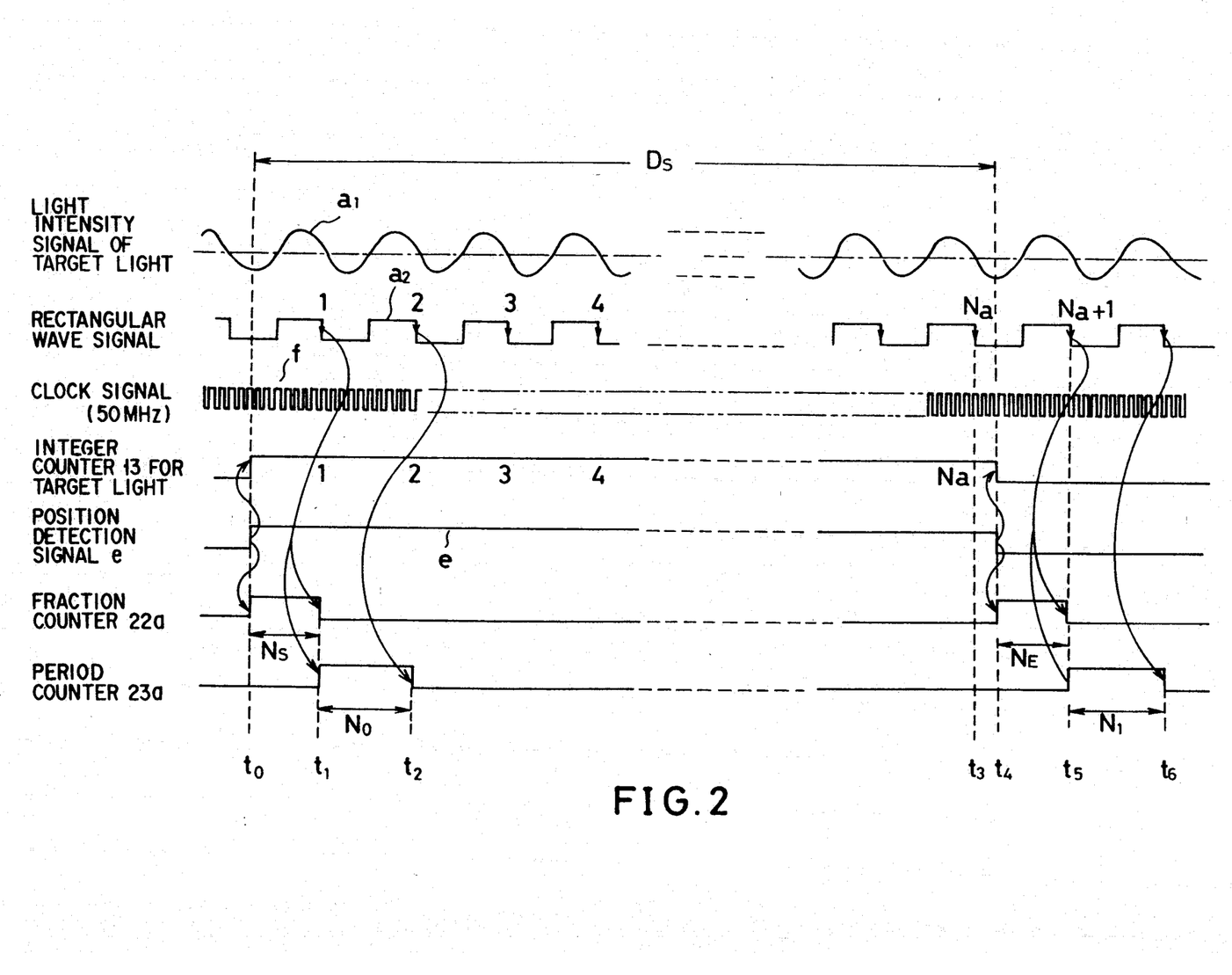
FIG. 2 is a timing chart for explaining an operation of the apparatus in FIG. 1.

The timing circuit 12 detects the leading and trailing edges of the position detection signal e and the trailing edges of the rectangular wave signals $a_2$ and $r_2$ obtained by shaping the respective interference fringe outputs, and supplies count start signals and count end signals to the counters 13, 15, 22a, 22r, 23a, and 23r at the timings shown in FIG. 2. More specifically, the timing circuit 12 causes the integer counters 13 and 15 to start counting at a timing $t_0$ at which the position detection signal e rises, and causes the counters 13 and 15 to stop counting at a timing $t_4$ at which the position detection signal e falls. In addition, the timing circuit 12 causes the fraction counters 22a and 22r to simultaneously start counting at the timings $t_0$ and $t_4$ synchronized with the rising and falling of the position detection signal e, and causes the counters 22a and 22r to stop counting at timings $t_1$ and $t_5$, respectively, at which the rectangular wave signals $a_2$ and $r_2$ fall for the first time after the rising timing and falling timing of the position detection signal e. Moreover, the timing circuit 12 causes the period counters 23a and 23r to start counting at timings $t_1$ and $t_5$, respectively, which are synchronized with the count stop timings of the fraction counters 22a and 22r, and causes the counters 23a and 23r to stop counting at next falling timings $t_2$ and $t_6$ of the rectangular wave signals $a_2$ and $r_2$, respectively.

The count values obtained by the counters 13, 15, and 22a to 23r are temporarily stored in a RAM 25 through a bus line 24. For example, the following components are connected to this bus line 24: a CPU 26 for executing various types of arithmetic operations; a ROM 27 for storing control programs; the RAM 25 for storing various types of variable data; an interface 28 for supplying the information of a measured wavelength $\lambda$ to, e.g., an external host computer; a key-input circuit 30 for receiving a key signal from a keyboard 29 used by an operator to key-input various types of commands; the motor driver 16; the timing circuit 12; and the like.

An operation of the light wavelength measuring apparatus having the above-described arrangement will be described below with reference to the timing chart shown in FIG. 2.

In the process of moving the movable mirror 7 in the interference spectroscopic unit 1 such as a Michelson interferometer by supplying a driving signal to the motor driver 16 and starting the moving motor 17, the interference light, of the target light a, output from the interference spectroscopic unit 1 such as a Michelson interferometer is converted into the light intensity signal $a_1$ including periodic, repetitive waveforms by the target light receiver 8. This light intensity signal $a_1$ is then converted into the rectangular signal $a_2$ by the waveform shaping circuit 10.

When the movable mirror 7 enters the range of the predetermined distance L at the timing $t_0$, the position detection signal e rises, and the integer counter 13 for target light starts counting at each of falling timings 1, 2, 3, 4, ..., Na, of the rectangular wave signal $a_2$, indicated by arrows in FIG. 2. At the same time, the fraction counter 22a starts counting the clocks of the clock signal f. When the rectangular wave signal $a_2$ falls at the timing $t_1$, the fraction counter 22a stops counting the clock signal f, and supplies the count value, as a fractional value $N_S$ of a wave count detection start portion, to the bus line 24. The fractional value $N_S$ of the wave count detection start portion output to the bus line 24 is temporarily stored in the RAM 25. At the same time, the fraction counter 22a is cleared. In addition, the period counter 23a starts counting the clock signal f at the timing $t_1$. When the rectangular wave signal $a_2$ rises again at the timing $t_2$, the period counter 23a stops the counting operation. The count value of the period counter 23a in the corresponding interval is stored, as a period $N_0$, in the RAM 25. At the same time, the period counter 23a is cleared.

When the movable mirror 7 is moved out of the range of the predetermined distance L at the timing $t_4$, the position detection signal e falls, and the integer counter 13 stops counting. The count value, of the integer counter 13, obtained in this interval is stored, as a repetitive waveform count Na, in the RAM 25. In synchronism with the falling timing of the position detection signal e, the fraction counter 22a is started to count the clock signal f. The fraction counter 22a stops counting at the next falling timing $t_5$ of the rectangular wave signal $a_2$. The count value, of the fraction counter 22a, obtained in this interval is stored, as a fractional value $N_E$ of a wave count detection end portion, in the RAM 25. The fraction counter 22a is then cleared. At the timing $t_5$, the period counter 23a starts counting the clock signal f. When the rectangular wave signal $a_2$ falls again at the timing $t_6$, the period counter 23a stops counting. The count value, of the period counter 23a, obtained in this interval is stored, as a period $N_1$, in the RAM 25. At the same time, the period counter 23a is cleared.

With the above operation, a series of measuring operations with respect to the target light a is completed. Note that actual writing processing of the respective count values, obtained by the counters 13, 22a, and 23a, with respect to the RAM 25 is executed by the CPU 26 which receives the respective timing signals from the timing circuit 12.

The CPU 26 corrects the repetitive waveform count Na by using the fractional value $N_S$ of the start portion, the fractional value $N_E$ of the end portion, and the periods $N_0$ and $N_1$ stored in the RAM 25 according to equation (2), thereby calculating a correct repetitive waveform count $N_A$ included within a change amount $D_S$ of the optical path length.

$$N_a = Na - 1 + N_S/N_0 + (N_1 - N_E)/N_1 \quad (2)$$
$$= Na + N_S/N_0 - N_E/N_1$$

Note that $(N_1 - N_E)$ corresponds to a time interval between the timing $t_3$ (repetitive waveform count = Na) at which the rectangular wave signal $a_2$ falls last and the timing at which the position detection signal e falls.

In the above-described manner, the number of interference fringes associated with the target light a is corrected such that the fractional value less than a value corresponding to one period is added to an integral value, thereby calculating the correct repetitive waveform count $N_A$ including the fractional value after the decimal point.

The number of interference fringes associated with the reference light r is corrected by adding a fractional value after the decimal point to an integral value, following the same procedure as described above, thus calculating a correct repetitive waveform (interference fringe) count $N_R$. Since the measurement/calculation process for the reference light is the same as that for the target light a, a description thereof will be omitted.

Subsequently, the CPU 26 calculates the wavelength λ of the target light by using the calculated repetitive waveform (interference fringe) counts $N_A$ and $N_R$, according to equation (3):

$$\lambda = (N_r/N_A)\lambda_0 \quad (3)$$

Equation (3) is based on the relations that $\lambda = D_S/N_A$ and $\lambda = D_S/N_R$. Therefore, it is apparent that $D_S = \lambda N_A = \lambda_0 N_R$.

Consequently, if the known wavelength $\lambda_0$ of the reference light r is accurately obtained, the change amount $D_S$ of the optical path length can be accurately calculated as $D_S = \lambda_0 N_R$ by using the known wavelength $\lambda_0$.

More specifically, if the prescribed distance $D_S$ value calculated in this manner or the change amount $D_S$, of the optical path length, accurately obtained by some other measurement technique is used, the wavelength λ of the target light a can be immediately obtained by the following equation without using equation (3) described above:

$$\lambda = D_S/N_A \quad (4)$$

In this case, the count $N_A$ can be obtained by various types of calculation techniques in addition to the technique based on equation (2).

The second embodiment of the present invention will be described next, in which it is assumed that such a value $D_S$ is known, and the wavelength of the target light a is immediately obtained according to equation (4).

Figure 6:
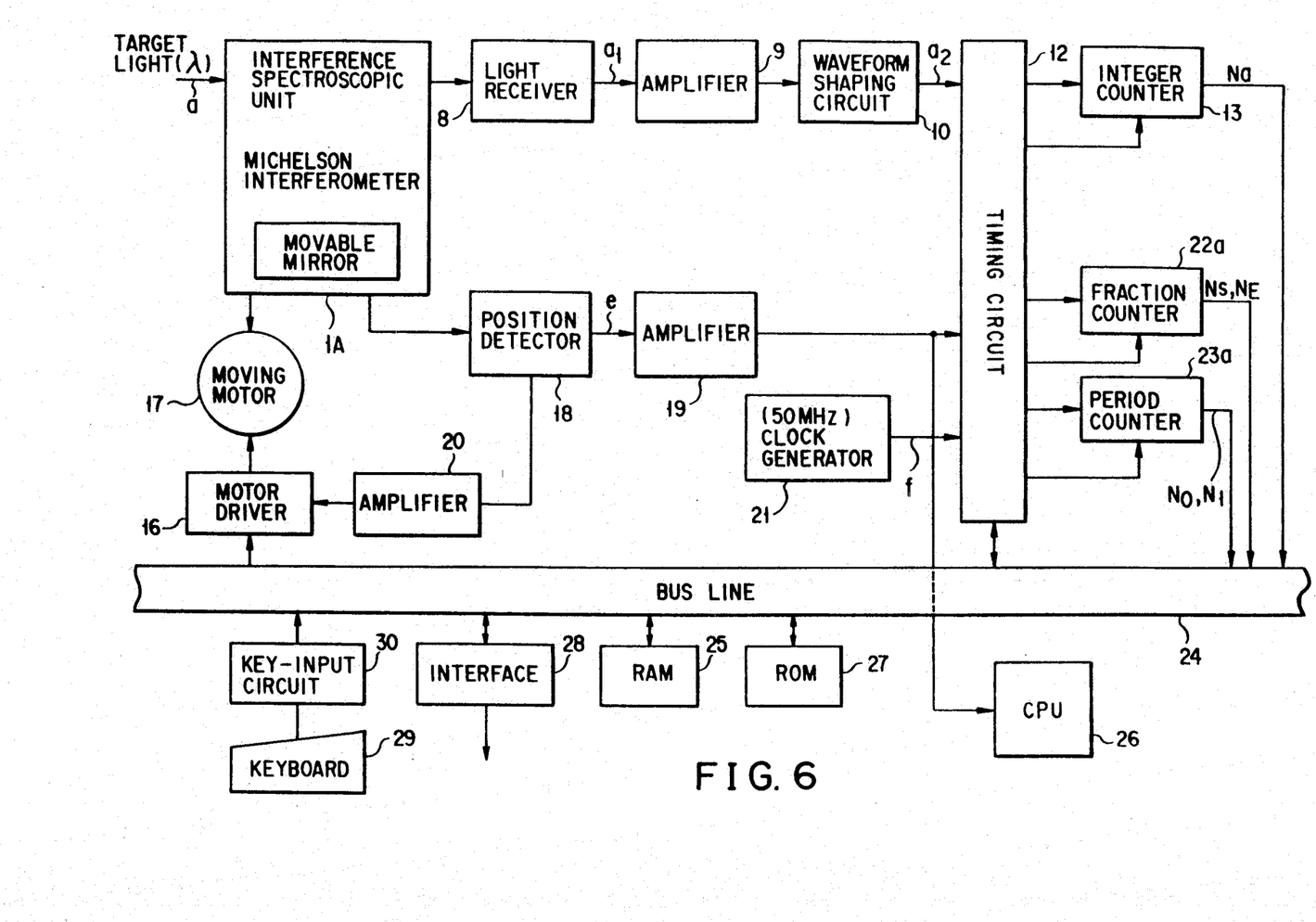
FIG. 6 is a block diagram showing a schematic arrangement of a light wavelength measuring apparatus according to the second embodiment of the present invention.
Figure 7:
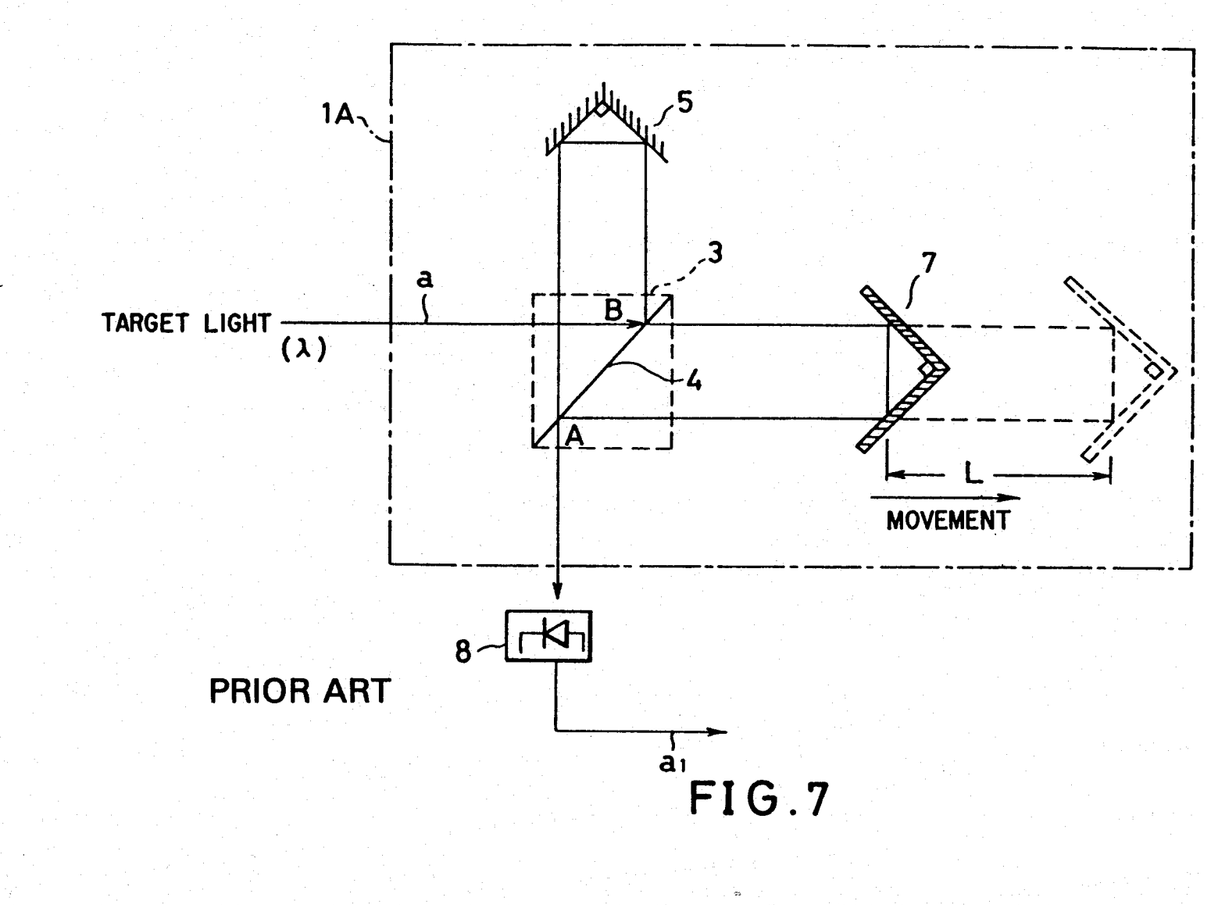
FIG. 7 is a schematic view showing an interference spectroscopic unit used for the apparatus in FIG. 6.

FIG. 6 shows the arrangement of the second embodiment of the present invention. FIG. 7 shows the internal arrangement of an interference spectroscopic unit 1A, such as a Michelson interferometer, used for the embodiment shown in FIG. 6.

The arrangement shown in FIGS. 6 and 7 is the same as that shown in FIGS. 1 and 3 except that the measurement system associated with the reference light r in the arrangement in FIGS. 1 and 3 is omitted.

In this embodiment, therefore, a number $N_A$ of repetitive waveforms (interference fringes) of a target light a is calculated by equation (2) basically in the same manner as in the first embodiment, and calculation of a wavelength λ of the target light a is executed by a CPU 26 using the number $N_A$ and a known value $D_S$ according to equation (4).

Note that the known value $D_S$ may be input through a keyboard 29 as needed or may be stored in a ROM 27 or a RAM 25 in advance.

Although the value $D_S$ can be obtained by using the number $N_R [= Nr + Ns/N_0 + (N_1 - N_E)/N_1]$ of the repetitive waveforms (interference fringes) of the reference light r, calculated by the measurement system associated with the reference light and shown in FIG. 1, according to $D_S = \lambda_0 N_R$ ($\lambda_0$ is a known value), the value $D_S$ may be obtained by other measurement techniques.

One of the measurement techniques is based on the following equation:

$$D_S = 2V \cdot t$$

where

V = moving speed of a movable mirror 7 t = time required to move the movable mirror 7 That is, the value $D_S$ can be accurately measured by various types of techniques to be set as a known value.

Figure 8:
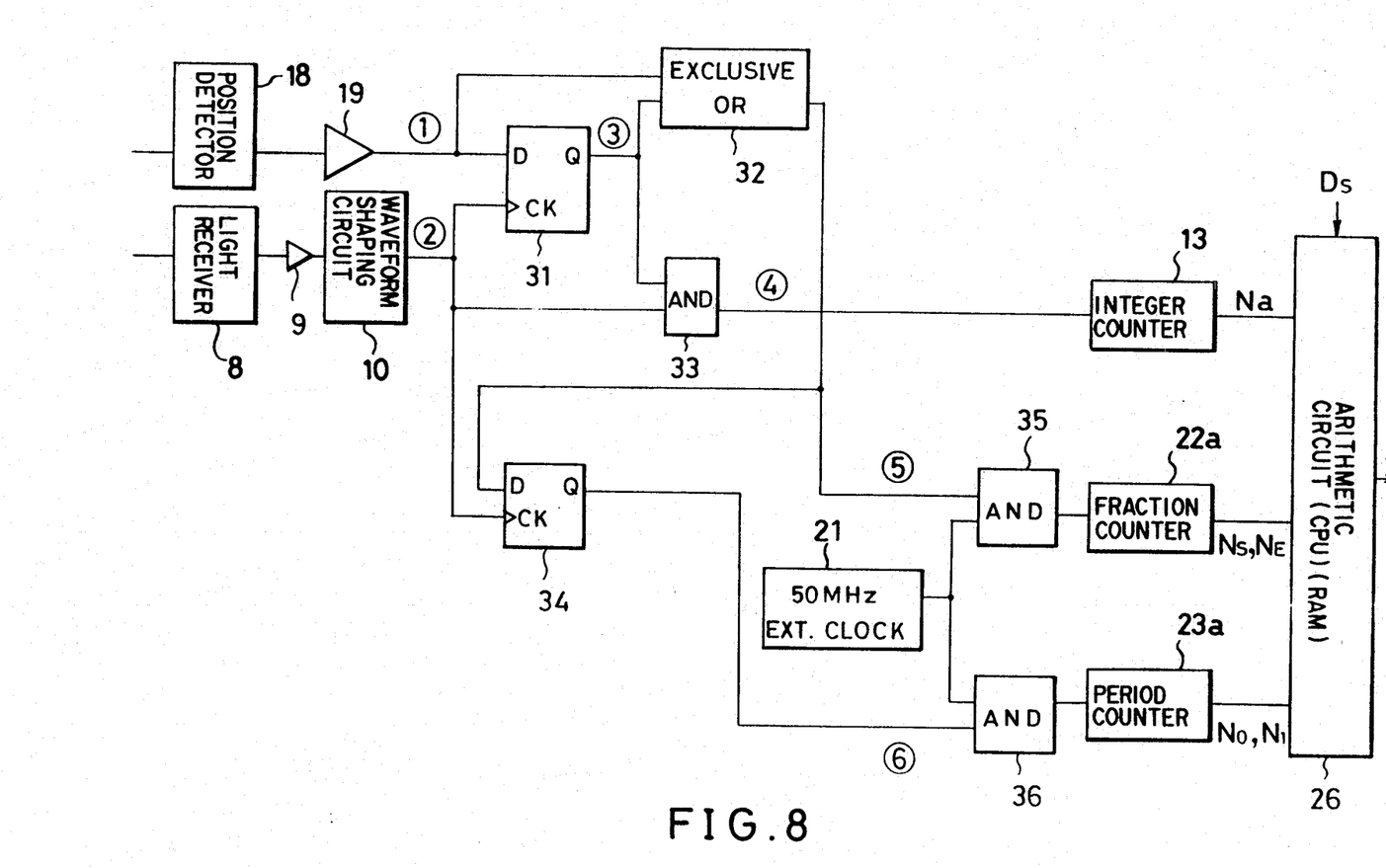
FIG. 8 is a block diagram showing a main part of the apparatus in FIG. 6 in more detail.

FIG. 8 shows the arrangement of a main part of the second embodiment in more detail. In this arrangement, a position detection signal ① of the movable mirror 7 and a repetitive waveform (interference fringe) signal ②, associated with target light a, are respectively input to a data terminal D and a clock terminal CK of a D-type flip-flop 31. The signals ① and ② are supplied from an interference spectroscopic unit 1 such as a Michelson interferometer through a position detector 18 and an amplifier 19 and through a light receiver 8, an amplifier 9, and a waveform shaping circuit 10, respectively. An output signal ③ from an output terminal Q of the D-type flip-flop 31 and the position detection signal ① are respectively supplied to the first and second input terminals of an exclusive OR gate 32. In addition, the interference fringe signal ② and the output signal ③ from the D-type flip-flop 31 are respectively supplied to the first and second input terminals of an AND gate 33. An output signal ④ from the AND gate 33 is supplied to an arithmetic circuit 37 including a CPU, a RAM, and the like through an integer counter 13. The interference fringe signal ② and an output signal ⑤ from the exclusive OR gate 32 are respectively input to a data terminal D and a clock terminal CK of a D-type flip-flop 34. The output signal from the exclusive OR gate 32 and a reference clock from a (50-MHz) clock generator 21 are respectively supplied to the first and second input terminals of an AND gate 35. An output signal from the AND gate 35 is supplied to the arithmetic circuit 37 through a fraction counter 22a. An output signal ⑥ and the reference clock from the (50-MHz) clock generator 21 are respectively supplied to the first and second input terminals of an AND gate 36. An output signal from the AND gate 36 is supplied to the arithmetic circuit 37 through a period counter 23a.

Figure 9:
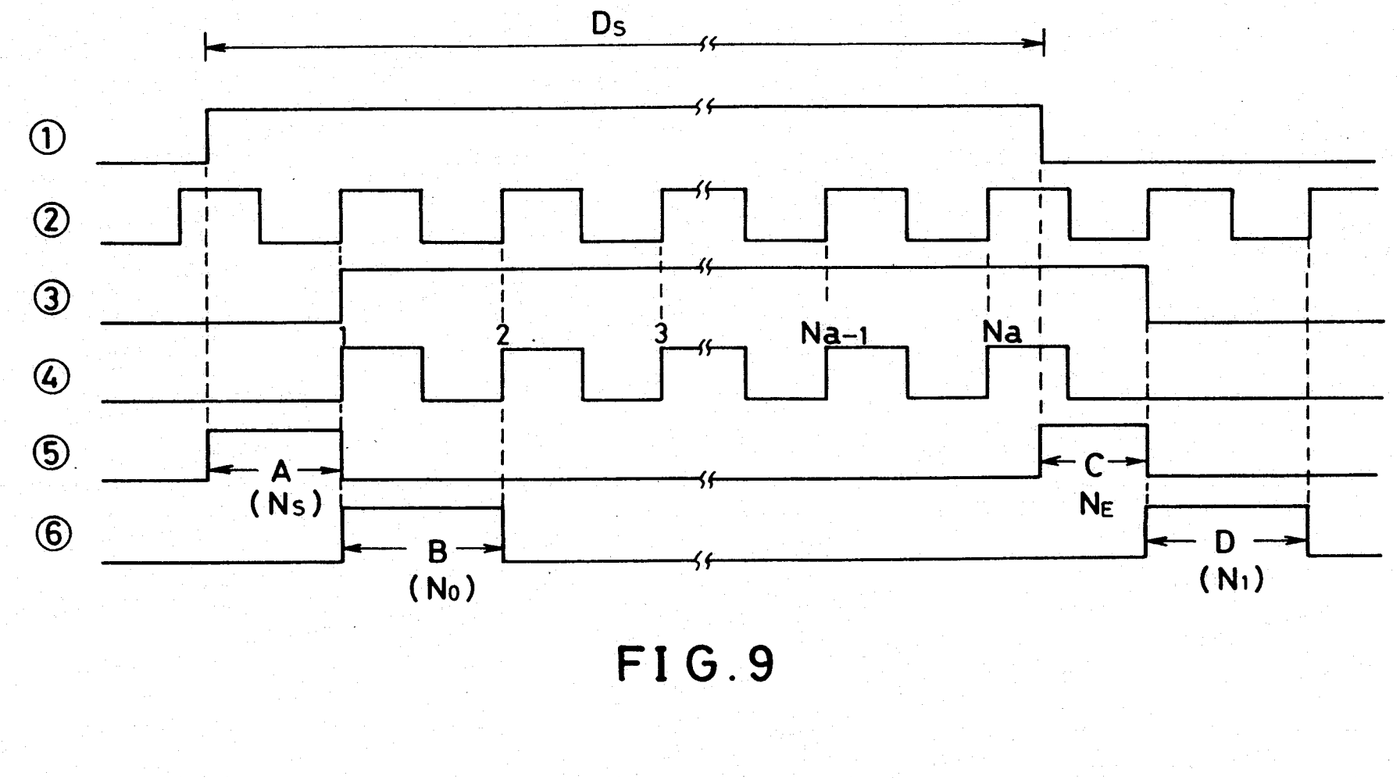
FIG. 9 is a timing chart for explaining an operation of the apparatus in FIG. 6.

FIG. 9 shows the relationship in timing between the respective signals ① to ⑧ in FIG. 8. Referring to FIG. 9, reference numeral denotes a position detection signal; ②, an interference fringe signal; ③, an output signal from the D-type flip-flop 31; ④, an output signal from the AND gate 33; ⑤, an output signal from the exclusive OR gate 32; and ⑥, an output signal from the D-type flip-flop 34.

In the output signal ⑤ from the exclusive OR gate 32, an interval associated with counting of a fractional portion at the leading edge of the position detection signal ①, i.e., the interference fringe signal, is represented by A, and an interval associated with counting of a fractional portion at the trailing edge of the signal ①, i.e., the interference fringe signal, is represented by C. In addition, in the output signal ⑥ from the D-type flip-flop 34, one period associated with the timing at which counting of the output signal ④ from the AND gate 33, i.e., counting of the integral portion of the interference fringe signal, is started is represented by B, and an interval associated with the timing at which the counting operation is ended is represented by D.

With the above-described operation, the integer counter 13 outputs a count value Na of the integral portion of the interference fringe signal, and the fraction counter 22a outputs (50-MHz) clock count values $N_S$ and $N_E$ in the intervals A and C. In addition, the period counter 23a outputs (50-MHz) clock count values $N_0$ and $N_1$ in the intervals B and D.

Figure 10:
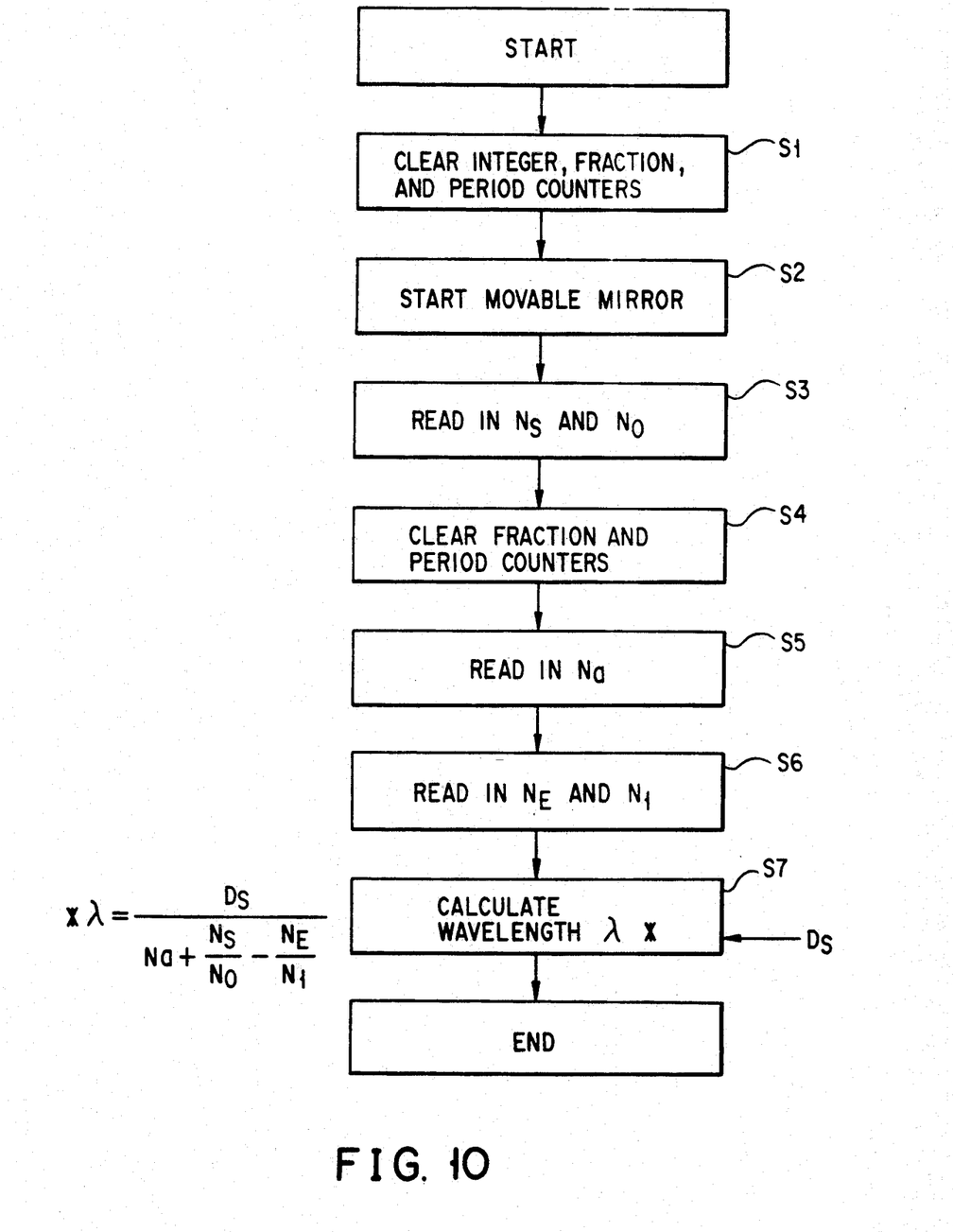
FIG. 10 is a flow chart for explaining an operation of the apparatus in FIGS. 6 and 8.

FIG. 10 is a flow chart of the second embodiment shown in FIGS. 8 and 9. In step S1, the integer counter 13, the fraction counter 22a, and the period counter 23a are cleared. In step S2, the movable mirror 7 in the interference spectroscopic unit 1 is started. Assume that the target light a is incident on the interference spectroscopic unit 1 at this time. In step S3, the count value $N_S$ of the fraction counter 22 and the count value $N_0$ of the period counter 23a are read in a RAM portion in the arithmetic circuit 37. In step S4, the counters 22a and 23a are cleared. In step S5, the count value Na of the integer counter 13 is read in the RAM portion in the arithmetic circuit 37. In step S6, the count values $N_E$ and $N_1$ of the fraction counter 22a and the period counter 23a are read in the RAM portion in the arithmetic circuit 37. In step S7, the arithmetic circuit 37 executes the following equation on the basis of the value $D_S$ stored in the RAM portion in advance and the count values Na, $N_S$, $N_E$, $N_0$, and $N_1$ read in the RAM portion in the above-described manner, thereby calculating the wavelength λ of the target light.

$$\lambda = \frac{D_S}{N_A} = \frac{D_S}{Na + \frac{N_S}{N_0} - \frac{N_E}{N_1}} \tag{5}$$

In equation (5), the denominator of the right-hand side serves to provide a correct interference fringe count $N_A$ for the change amount $D_S$ of the optical path length, similar to equation (2).

Figure 11:
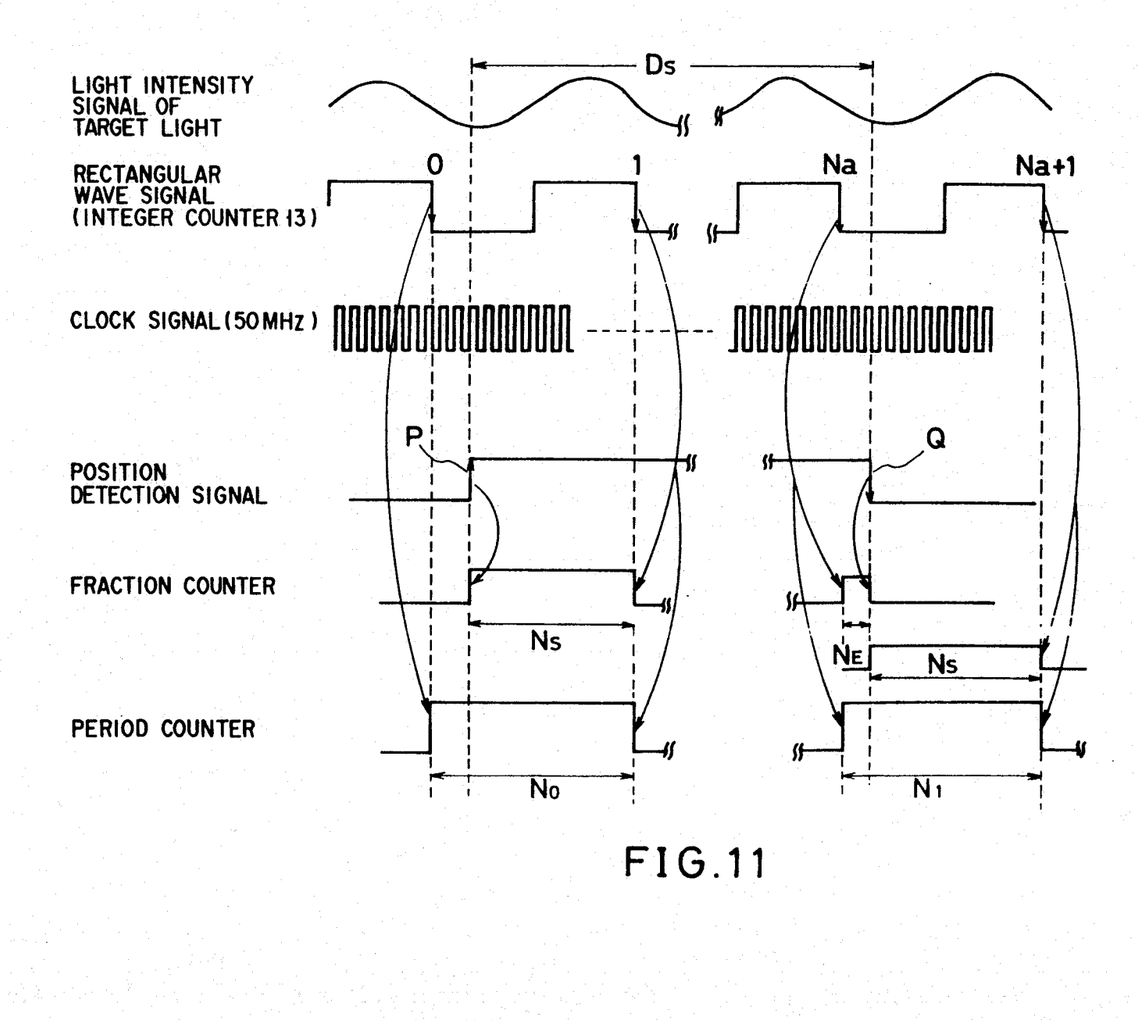
FIG. 11 is a timing chart showing another relationship in timing for obtaining fractional values of interference signals in the second embodiment.

FIG. 11 shows another relationship in timing for obtaining a fractional value less than a value corresponding to one period at wave count start and end portions. More specifically, in this case, the timings at which the period counter 23a starts counting to obtain the count values $N_0$ and $N_1$ are respectively synchronized with the falling and rising timings of the position detection signal. Counting operations will be sequentially described below.

A Counting of Rectangular Wave in One Period ($N_0$, $N_1$)

(a) The period counter 23a is caused to start counting the (50-MHz) clock signal at the trailing edges (0) and (Na) of the rectangular wave signal.

(b) If the leading edge (P) and trailing edge (Q) of the position detection signal do not arrive before the next trailing edges (1) and (Na+1) of the rectangular wave signal, the period counter 23a is reset at the trailing edges (1) and (Na+1) of the rectangular wave signal and is caused to start a new counting operation of the clock signal.

(c) If the leading edge (P) and trailing edge (Q) of the position detection signal arrive in step (b), the count values $N_0$ and $N_1$ obtained in the corresponding periods are output without resetting the period counter 23a.

B Counting of Fraction of Count Start Portion (a) The fraction counter 22a is caused to start counting the clock signal at the leading edge (P) of the position detection signal.

(b) The fraction counter 22a is caused to stop counting at the trailing edge (1) of the rectangular wave signal, and the fractional value of the count start portion is obtained on the basis of the ratio of the count value $N_S$ in the corresponding interval to the count value $N_0$ obtained in step (c) of [A].

C Counting of Fraction of Count End Portion (a) The fraction counter 22a is caused to start counting the clock signal at the trailing edge (Na) of the rectangular wave signal.

(b) The fraction counter 22a is caused to stop counting at the trailing edge (Q) of the position detection signal, and the fractional value of the count end portion is obtained on the basis of the ratio of a count value $N_E'$ in the corresponding interval to the count value $N_1$ obtained in step (c) of [A].

In this case, the fractional value of the count end portion may be calculated by obtaining the value $N_E$ and equation (2), instead of directly obtaining the value $N_E'$.

In addition, if $N_0 = N_1$ can be set, it is only required to obtain either the value $N_0$ or the value $N_1$.

According to the light wavelength measuring apparatus having such an arrangement, the fraction counter can obtain the repetitive waveform count of a light intensity signal in a case wherein the movable mirror in the interference spectroscopic unit is moved by a predetermined distance so that the optical path length is changed by the change amount $D_S$. In addition, the fraction counter can obtain a start fractional value between the count start timing of the wave counter and the timing at which the first count position of repetitive waveforms actually arrives, and can obtain an end fraction value between the count end timing and the timing at which the next count position arrives. In addition, the period of the repetitive waveforms is obtained by the period counter. Therefore, the ratio of each fractional value to the period, i.e., a fractional value after the decimal point, which is used to correct a previously obtained repetitive waveform count, can be obtained.

In another embodiment, the number of repetitive waveforms of the target light and that of the reference light having the known wavelength are simultaneously counted. Subsequently, the repetitive waveform counts of the target light and the reference light, each having a precision to fractions after the decimal point, can be obtained by the above-described technique. Therefore, the correct wavelength of the target light is calculated on the basis of the wavelength of the reference light and the ratio between the repetitive waveform counts.

That is, according to the above-described light wavelength measuring apparatus, since the repetitive waveform (interference fringe) count $N_A$ of the target light a, including both an integral value and a fractional value, can be calculated with high precision, the wavelength measurement precision can be greatly improved as compared with the conventional apparatus in which the repetitive waveform count Na can assume only an integral value.

Furthermore, since an increase in manufacturing cost due to the installation of the fraction counter 22a and the period counter 23a is much lower than the cost required to increase the moving distance of the moving mirror 7 in the interference spectroscopic unit 1 such as a Michelson interferometer, high measurement precision can be achieved without greatly increasing the manufacturing cost. In addition, according to the present invention, since a measurement precision of ±0.1 Pm can be obtained by setting the moving distance of the movable mirror to be about 20 cm, the overall apparatus is not greatly increased in size.

As has been described above, according to the light wavelength measuring apparatus of the present invention, when the number of repetitive waveforms (interference fringes) of a light intensity signal from the interference spectroscopic unit is to be counted by the counters, the fraction counter is used to count fractional values of the repetitive waveforms (interference fringes) at the count start and end timings together with the integer count for counting the integral value of the repetitive waveforms. With this operation, a correct repetitive waveform (interference fringe) count including fractional values after the decimal point can be calculated without increasing the moving distance of the movable mirror in the interference spectroscopic unit. Therefore, a great increase in size of the apparatus can be prevented, and the wavelength measurement precision and resolution can be greatly improved.

The present invention is not limited to the embodiments described above and shown in the accompanying drawings. Various changes and modifications can be made within the spirit of the invention.

Industrial Applicability

The light wavelength measuring apparatus of the present invention can measure the wavelength of target light with high precision and high resolution by counting the number of interference fringes of the target light, obtained by the interference spectroscopic unit, including both an integral value and fractional values less than one period, with high precision. Therefore, the apparatus can be applied to various fields, e.g., optical communication apparatuses and optical measurement devices which are reduced in size as much as possible and utilize laser beams.

What is claimed is:

1. A light wavelength measuring apparatus, including an interference spectroscopic section, for measuring an unknown wavelength ($\lambda$) of target light using a number (N) of interference fringes having predetermined repetitive waveforms generated in correspondence to the unknown wavelength ($\lambda$) of the target light when an optical path length is changed by a known change amount ($D_S$) by continuously moving a movable portion of the interference spectroscopic section, on which the target light is incident, at a constant speed throughout a predetermined distance (L) according to an arithmetic operation expressed by $\lambda = D_S/N$, said apparatus comprising:

light receiving means for receiving from the interference spectroscopic section interference fringes which correspond to the wavelength of the target light, and for converting the received interference fringes into an electric interference fringe signal;

position detecting means for detecting whether or not the movable portion of the interference spectroscopic section is at a position within a movement range corresponding to the predetermined distance (L);

reference pulse generated means for generating a reference pulse having a higher frequency than that of the predetermined repetitive waveforms of the interference fringes;

a first D-type flip-flop having a data terminal for receiving a position detection signal output from the position detecting means, and a clock terminal for receiving the electric interference fringe signal output from the light receiving means;

an exclusive-OR gate for receiving the position detection signal output from the position detecting means and for receiving an output signal produced by the first D-type flip-flop;

a first AND gate for receiving the electric interference fringe signal from the light receiving means and for receiving the output signal produced by the first D-type flip-flop;

a second D-type flip-flop having a data terminal for receiving an output signal produced by the exclusive-OR, and a clock terminal for receiving the electric interference fringe signal output from the light receiving means;

a second AND gate for receiving the output signal produced by the exclusive-OR gate and for receiving the reference pulse generated by the reference pulse generating means;

a third AND gate for receiving an output signal produced by the second D-type flip-flop and for receiving the reference pulse generated by the reference pulse generating means;

an integer counter for counting the number of output signals produced by the first AND gate and for outputting a count value (Na) corresponding to a measured number of integer portions included in the electric interference fringe signal;

a fraction counter for counting the number of output signals produced by the second AND gate and for outputting reference pulse count values ($N_S$ $N_E$) corresponding to fraction portions at the rise and fall of the electric interference fringe signal, respectively;

a period counter for counting the number of output signals produced by the third AND gate and for outputting reference pulse count values ($N_0$, $N_1$) corresponding to periods respectively detected at start and end times of measurement of the integer portions of the electric interference fringe signal; and arithmetic means for obtaining the wavelength ($\lambda$) of the target light by executing the arithmetic operation expressed by:

$$\lambda = \frac{D_S}{N} = \frac{D_S}{Na + N_S/N_0 - N_E/N_1}$$

in accordance with the known value $D_S$: the count value (Na) output from the integer counter and corresponding to the number of integer portions of the electric interference fringe signal; the reference pulse count values ($N_S$, $N_E$) output from the fraction counter and corresponding to the fraction portions of the electric interference fringe signal, respectively; and the reference pulse count values ($N_0$, $N_1$) output from the period counter an corresponding to the periods respectively detected at the start and end times of the measurement of the integer portions of the electric interference fringe signal.

2. An apparatus according to claim 1, wherein said arithmetic means includes:

means for reading, at first timings, the reference pulse count values ($N_S$, $N_0$) output from the fraction and period counters;

means for clearing the fraction and period counters at second timings; and means for reading, at third timings, the count value (Na) output from the integer counter, and for reading, at fourth timings, the reference pulse count values ($N_E$, $N_1$) output from the fraction and period counters.

3. An apparatus according to claim 1, further comprising:

means for calculating the change amount ($D_S$) in the optical path length by performing an operation expressed by:

$$D_S = 2V \cdot t$$

where V is a moving speed of the movable portion of the interference spectroscopic section, and t is a time required to move the movable portion, whereby the change amount ($D_S$) is determined as a known value.

4. An apparatus according to claim 1, further comprising:

means for calculating the change amount ($D_S$) in the optical path length by performing an operation expressed by:

$$D_S = \lambda_0 N_R$$

where $\lambda_0$ is a known wavelength of reference light, and $N_R$ is the number of interference fringes which are generated when the movable portion of the interference spectroscopic section is continuously moved at the constant speed throughout the predetermined distance (L), with the reference light being made incident on the movable portion of the interference spectroscopic portion, whereby the change amount ($D_S$) is determined as a known value.

5. An apparatus according to claim 1, further comprising:

means for supplying the change amount ($D_S$) in the optical path length to the arithmetic means as a known value.

6. An apparatus according to claim 1, further comprising:

means for storing the change amount ($D_S$) in the optical path length as a known value.

7. An apparatus according to claim 1, wherein said interference spectroscopic section includes:

means for dividing the target light into two target light components which travel in first and second optical paths, respectively;

stationary reflection means for reflecting the target light component traveling in the first optical path; and movable reflection means, constituted by said movable portion, for reflecting the target light component traveling in the second optical path while simultaneously moving a predetermined distance;

said interference spectroscopic section outputting interference fringes obtained by interference between light reflected by the stationary reflection means and light reflected by the movable reflection means.

8. An apparatus according to claim 1, wherein said reference pulse generating means generates a reference pulse of approximately 50 MHz.

9. An apparatus according to claim 8, wherein said movable portion of the interference spectroscopic section is moved approximately 20 cm.

10. An apparatus according to claim 1, wherein said movable portion of the interference spectroscopic section is moved approximately 20 cm.

* * * * *